(12) United States Patent
Austin

(10) Patent No.: US 6,845,737 B1
(45) Date of Patent: Jan. 25, 2005

(54) COMBINATION BALL AND DOG LEASH

(76) Inventor: Larry Shane Austin, 191 Sunny Knoll La., Boone, NC (US) 28607

( * ) Notice: Subject to any disclaimer, the term of this patent is extended or adjusted under 35 U.S.C. 154(b) by 0 days.

(21) Appl. No.: 10/705,792

(22) Filed: Nov. 10, 2003

(51) Int. Cl.$^7$ .......................... A01K 27/00; B65H 75/48
(52) U.S. Cl. ..................... 119/796; 119/795; 242/379; 242/381.6
(58) Field of Search ................. 119/796, 795, 119/769; 242/379, 381.6

(56) References Cited

U.S. PATENT DOCUMENTS

| | | | |
|---|---|---|---|
| 721,460 A | 2/1903 | McDougall | |
| 2,250,171 A | 7/1941 | Wilkins | |
| D128,606 S | * 8/1941 | Stickell | ...................... D30/153 |
| 2,889,807 A | 6/1959 | Beebe | |
| D198,757 S | * 7/1964 | Rogers | ...................... D30/153 |
| 3,198,175 A | 8/1965 | Dean | |
| 3,318,288 A | 5/1967 | Mullritter | |
| D216,897 S | * 3/1970 | Meath | ...................... D30/153 |
| 4,018,189 A | 4/1977 | Umphries et al. | |
| 4,328,767 A | 5/1982 | Peterson | |
| 4,887,551 A | 12/1989 | Musetti | |
| 5,762,029 A | 6/1998 | DuBois et al. | |
| D484,650 S | * 12/2003 | Meath | ...................... D30/153 |

* cited by examiner

Primary Examiner—Teri P. Luu
Assistant Examiner—Bret Hayes
(74) Attorney, Agent, or Firm—Michael I. Kroll

(57) ABSTRACT

The present invention 10 discloses a ball 12 having a leash 14 forming an integral part therewith. The ball-leash is comprised of an exterior ball housing 12 in the form of a ball having flap 26 providing access to the leash 14 contained therein. The flap 26 covers leash access cap 28 that is seated within threaded aperture 38 within the housing 12. The cap 28 is tethered 30 to the leash element 14 so that when the cap 28 is removed the leash element is withdrawn from the interior cavity 24 of the ball-leash. The leash element is comprised of pet strap 14 having a fastener 20 for attaching to the pet 16 with the strap fixedly attached to a tensioning member 40 within the housing 12 that will automatically retract the strap 14 into the housing as pressure is removed therefrom.

10 Claims, 11 Drawing Sheets

COMBINATION BALL AND DOG LEASH

BACKGROUND OF THE INVENTION

1. Field of the Invention

The present invention relates generally to animal leashes and, more specifically, to a ball having a leash forming an integral part therewith. The ball-leash is comprised of an exterior housing in the form of a ball having dimples with channels providing means for using the ball surfaces has a leash handle. Also within the exterior surface is a flap cover leash access cap that is seated within a threaded aperture within the housing. The cap is tethered to the leash element so that when the cap is removed the leash element is withdrawn from the interior of the ball-leash. The leash element is comprised of a pet strap having a fastener for attachment to the pet with the strap fixedly attached to a tensioning member within the hosing that will automatically retract the strap into the hosing as pressure is removed therefrom.

2. Description of the Prior Art

There are other leashes device designed with multiple functions. Typical of these is U.S. Pat. No. 721,460 issued to McDougall on Feb. 24, 1903.

Another patent was issued to Wilkins on Jul. 22, 1941 as U.S. Pat. No. 2,250,171. Yet another U.S. Pat. No. 2,889,807 was issued to Beebe on Jun. 9, 1959 and still yet another was issued on Aug. 3, 1965 to Dean as U.S. Pat. No. 3,198,175.

Another patent was issued to Mullritter on May 9, 1967 as U.S. Pat. No. 3,318,288. Yet another U.S. Pat. No. 4,018,189 was issued to Umphries, et al. on Apr. 19, 1977. Another was issued to Peterson on May 11, 1982 as U.S. Pat. No. 4,328,767 and still yet another was issued on Dec. 19, 1989 to Musetti as U.S. Pat. No. 4,887,551.

Another patent was issued to DuBois, et al. on Jun. 9, 1998 as U.S. Pat. No. 5,762,029. Yet another Canadian Patent No. 2,344,330 was issued to Edwards, et al. on Mar. 3, 2000.

U.S. Pat. No. 721,460

Inventor: Walter McDougall

Issued: Feb. 24, 1903

A reel-holder comprising a back plate constructed with a peripheral, flange having recesses, and an inset annular rim, and a cover having an annular rim seating on the peripheral flange and formed with ears at its free edge adapted to fit in the recesses and to lap the back plate.

U.S. Pat. No. 2,250,171

Inventor: Hugh A. Wilkins

Issued: Jul. 22, 1941

In a device of the class described, a reel, a leash wound on the reel, a casing in which the reel is rotatably mounted, a hollow nipple on the casing forming a passage for the leash, projections at each side of the nipple forming with it separate seats for the fingers, the casing being small enough to be grasped in one hand with the nipple between adjacent fingers.

U.S. Pat. No. 2,889,807

Inventor: Douglas N. Beebe

Issued: Jun. 9, 1959

A dog leash assembly for substantially permanent attachment to a dog collar, said leash assembly comprising: a casing having an opening; a drum rotatively mounted in said casing; spring means engaging said drum to bias the drum toward rotation in one direction; and a leash extending through said opening and windable on said drum; said leash having a loop at one end thereof defined by a terminal portion of the leash having its extremity permanently secured to an adjacent portion of the leash; said loop encircling said drum; said drum having portions for impositive and continuous frictional engagement with said leash to assure initiation of rewinding onto said drum, whereby the connection of the leash with the drum is of optimum strength and original assembly of the leash onto said drum is facilitated.

U.S. Pat. No. 3,198,175

Inventor: John H. Dean

Issued: Aug. 3, 1965

A dog leash comprising a hollow elongated ovate sheet material shell provided with axially aligned concave-convex end portions joined by an intervening generally cylindrical body portion, said shell being of a length, size and weight that it can be conveniently and comfortably held in the hand of the user when being used, said body portion having a leash-accommodating slot, a shaft located in the hollow portion of said shell. With its respective end portions fixed in place and connected with axial portions of the concave-convex end portions, said shaft being provided intermediate its ends with a journal and said journal registering—with and bridging said slot, a reel confined in the hollow portion of said shell and having a hub portion, freely turnable on said journal and provided at its respective ends with heads, one of said heads having a coil spring incorporated therein, said coil spring having one end attached to said one head and the other end fixedly attached to said shaft, an elongated tape constituting the aforementioned leash and having an inner end attached to and wound on said hub between said heads and an outer end portion slidingly operable in and through said slot, said outer end being provided with a link and a complemental snap fastener, said snap fastener being swivelly joined to said link, the portions of said body portion encircling and proximal to the respective heads being yieldingly resilient and manually squeezed by the fingers of the hand of the user and compressed into gripping engagement with the respective heads in a manner to provide the desired at will brake action.

U.S. Pat. No. 3,318,288

Inventor: Herbert Mullritter

Issued: May 9, 1967

A dog-leash assembly comprising a leash, a pillbox shaped housing having a peripheral exit slot for said leash, a central stud in said housing, a reel rotatable about said stud within said housing, a coil spring anchored to said stud and to said reel while surrounding said stud for tending to hold said reel in a predetermined starting position in which said leash is wound therearound and fully retracted into said housing, a disk rigid with said reel and transverse to the axis thereof, said disk being provided with at least one eccentric perforation, said housing having an aperture aligned with said perforation in a predetermined angular position of said reel, a control member provided with rocker feet and with a detent penetrating said aperture, said member being accessibly disposed on the outside of said housing, and a flat spring secured to said housing and engaging said rocker feet for retaining said member on said housing and biasing it toward a position in which said detent engages in said perforation, thereby releasably arresting said reel.

U.S. Pat. No. 4,018,189

Inventor: James Otis Umphries

Issued: Apr. 19, 1977

A retractable leash for dogs and other pets. A casing is fastened to a dog collar and remains connected thereto during periods when the animal is not being walked. A rotatable reel is supported in the casing and a flexible leash is wound about the reel. One end of the leash is externally accessible of the casing by connection to a handle. A spring engages both the reel and the casing and tightly coils in response to the unwinding of the leash. A removable cover on one side of the casing facilitates servicing, the cover being locked closed by the attachment to the animal's collar.

U.S. Pat. No. 4,328,767

Inventor: Edwin R. Peterson

Issued: May 11, 1982

A retractor mechanism is mounted on the collar adjacent the buckle, the weight of these parts holding them under the animal's neck when the leash is retracted. A guide ring half way around the collar provides a stop for a handle on the free end of the leash when the leash is retracted, thus positioning the handle on top of the animal's neck when the leash is not in use. A semicircular spring steel stiffening member extends between the retractor mechanism and said guide ring to secure these parts to the collar and provide a smooth sliding surface for the leash as it is extended and retracted.

U.S. Pat. No. 4,887,551

Inventor: Louis J. Musetti

Issued: Dec. 19, 1989

This invention relates to a leash which coils up automatically when the handle is released. The invention comprises a generally cylindrical center portion with handles on either side, which is manufactured in two parts and can be assembled easily. The two parts are then sonically sealed to provide a strong and secure body. A retractable spring is fixedly attached inside the body in such a manner that it easily pulls out and retracts without catching or snagging.

U.S. Pat. No. 5,762,029

Inventor: Craig A. DuBois

Issued: Jun. 9, 1998

An apparatus having a retractable leash and an integral light. The apparatus has a first housing section and a retractable leash section. The first housing section has a handle, a light connected to top front portion of the first housing section and a receiving area. A rechargeable battery is removably connected to the first housing in the handle. The retractable leash section has a second housing section pivotably mounted to the first housing section, in the receiving area, and a reel rotatably mounted to the second housing section. A leash is connected to the reel for extension and retraction relative to the first housing section. In an alternate embodiment, a light is located on the leash and electrically connected to a conductor extending along the leash.

Canadian Patent Number 2,344,330

Inventor: Timothy Edwards, et al.

Issued: Mar. 23, 2000

A leash assembly includes a retractable leash in combination with a pet refuse bag dispenser. The bag dispenser underlies a handle of the leash assembly and includes a lid for permitting access to an inner cavity in which a plurality of bags is disposed. The bag dispenser is either integrally formed with the leash handle, or removably connected to a base of the handle. The plastic bags are disposed within the inner cavity such that the bags may be individually removed. The plastic bags may be selectively removed through a window provided in a side wall of the bag dispenser. The plastic bags may also be removed through a lid having slits through a flexible membrane.

While these leash devices may be suitable for the purposes for which they were designed, they would not be as suitable for the purposes of the present invention, as hereinafter described.

SUMMARY OF THE PRESENT INVENTION

The present invention discloses a ball having a leash forming an integral part therewith. The ball-leash is comprised of an exterior ball housing in the form of a ball having channels for insertion therein of a user's fingertips for gripping the ball leash when it is being used as a leash. There is also a flap providing access to the leash contained therein. The flap covers the leash access cap that is seated within the threaded aperture within the housing. The cap is tethered to the leash element so that when the cap is removed the leash element is withdrawn from the interior cavity of the ball-leash. The leash element is comprised of a pet strap having a fastener for attaching to the pet with the strap fixedly attached to a tensioning member within the housing that will automatically retract the strap into the housing as pressure is removed therefrom.

A primary object of the present invention is to provide a leash that can function as a leash and as a ball toy for a pet.

Another object of the present invention is to provide a ball-leash having an exterior covering having a flap formed therein providing access means to the leash element.

Yet another object of the present invention is to provide a ball-leash having a threaded aperture within the structural wall of the ball leash providing means for extending and retracting the leash element therethrough.

Still yet another object of the present invention is to provide a ball-leash having a threaded aperture and mating threaded cap for inserting therein whereby when seated the cap provides a waterproof housing for the leash element.

Another object of the present invention is to provide a ball-leash having channels formed within the exterior surface of the ball providing means for using the exterior surface as a handle while the leash is being used.

Yet another object of the present invention is to provide a ball-leash having a pet strap element that can be selectively extended and retracted into the ball-leash housing.

Still yet another object of the present invention is to provide a locking element for the leash whereby the user can position the leash to a desired position and engage the locking element to prevent further extension of the leash.

Additional objects of the present invention will appear as the description proceeds.

The present invention overcomes the shortcomings of the prior art by providing a ball having a leash forming an integral part therewith. The ball-leash is comprised of an exterior housing in the form of a ball having channels formed in the exterior surface whereby the ball forms a handle while the leash is being used. Also positioned within the ball covering is a flap providing access, to the leash contained therein. The flap covers a leash access cap that is seated within a threaded aperture within the housing. The cap is tethered to the leash element so that when the cap is removed the leash element is withdrawn from the interior of the ball-leash. The leash element is comprised of a pet strap having a fastener for attachment to the pet with the strap fixedly attached to a tensioning member within the hosing that will automatically retract the strap into the hosing as pressure is removed therefrom.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the present invention may be more fully understood, it will now be described, by way of example, with reference to the accompanying drawings in which.

LIST OF REFERENCE NUMERALS

Figure 1:
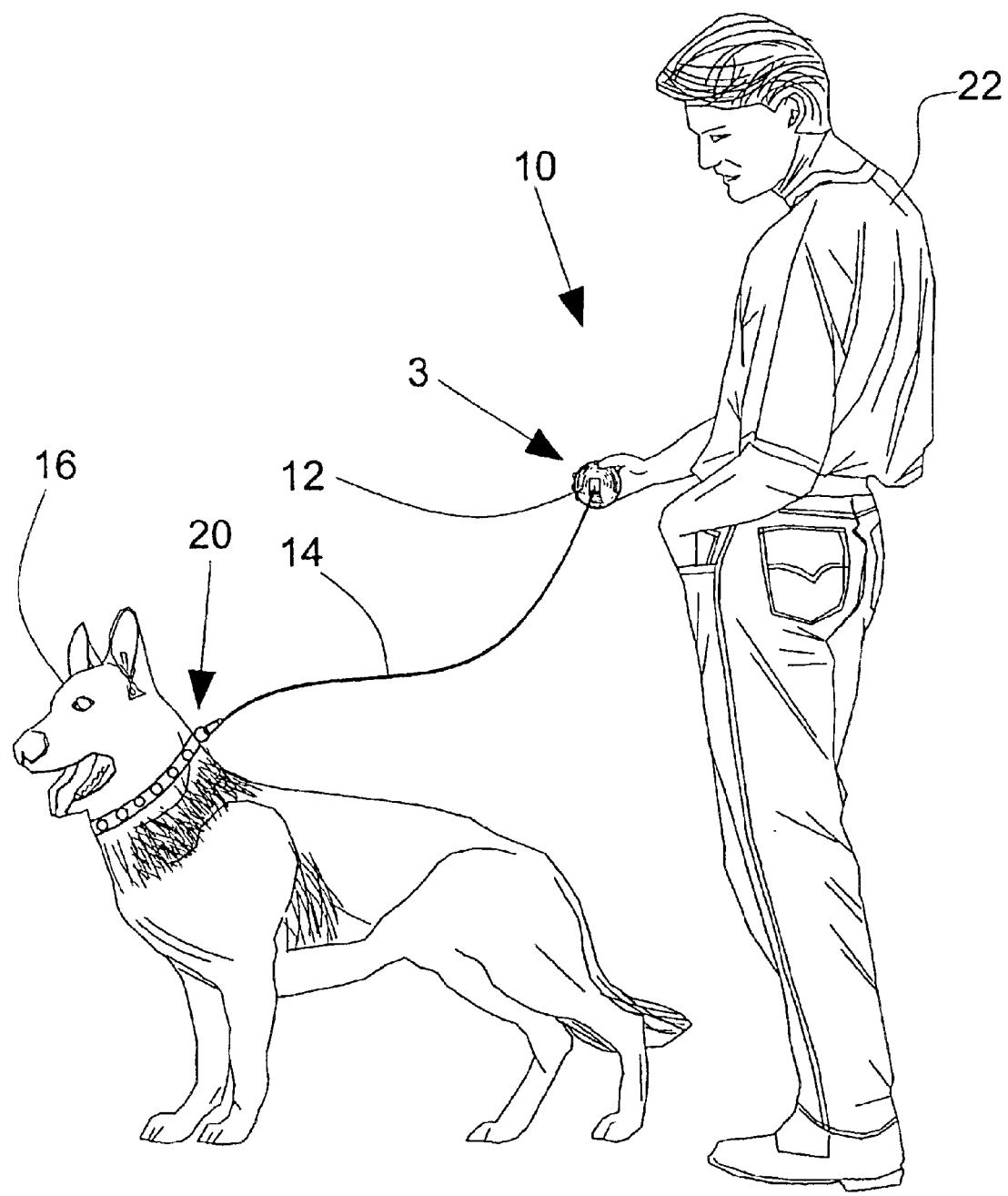
FIG. 1 is an illustrative view of the present invention in use.

With regard to reference numerals used, the following numbering is used throughout the drawings.

10 present invention
12 ball
14 leash
16 animal
20 clasp
22 user
24 cavity
26 flap
28 threaded cap
30 tether
32 collar
34 recess
36 hook and loop fasteners
38 threaded aperture
40 tensioning member
42 center post
44 gripping means
46 dimples
48 channels
49 locking element
50 wound spring
52 unwound spring
54 direction of winding arrow
56 tab
58 threads
60 live hinge

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10 in use. The present invention 10 discloses a ball-leash comprised of a ball 12 having a leash 14 contained therein for leading an animal 16. The present invention 10 is comprised of a retractable strap or leash 14 with a clasp 20 fastened to the distal end of the strap 14. The ball-leash 10 can be used by a person 22 to walk a pet 16 just as any normal leash and can be converted into a ball that can be used to play with the pet when in an area such as a park. The strap elements forming the leash are stored within the cavity of the ball 12 when not in use.

Figure 2:
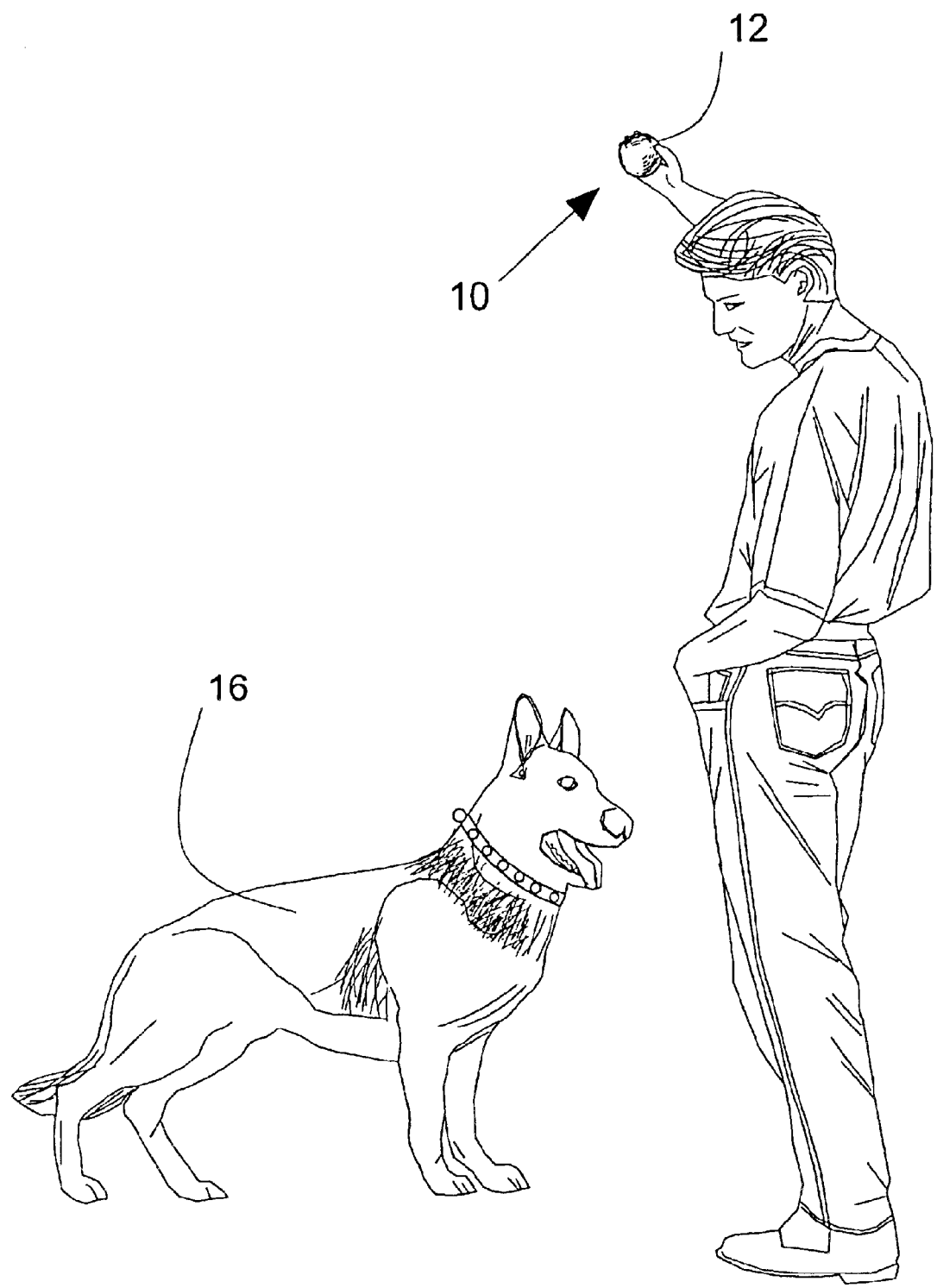
FIG. 2 is an illustrative view of the present invention in use.

Turning to FIG. 2, shown therein is an illustrative view of the present invention 10 in use. Shown is the ball-leash of the present invention 10 being used as a ball 12 toy for the pet 16. The leash elements are stored within the cavity of the ball 12 and are covered by a flap formed within the exterior covering of the ball-leash and comprised of the same material as the rest of the ball-leash. The covering will prevent the pet 16 from coming into contact with the leash elements and will allow the ball-leash to have the functions of a ball 12 such as rolling and bouncing.

Figure 3:
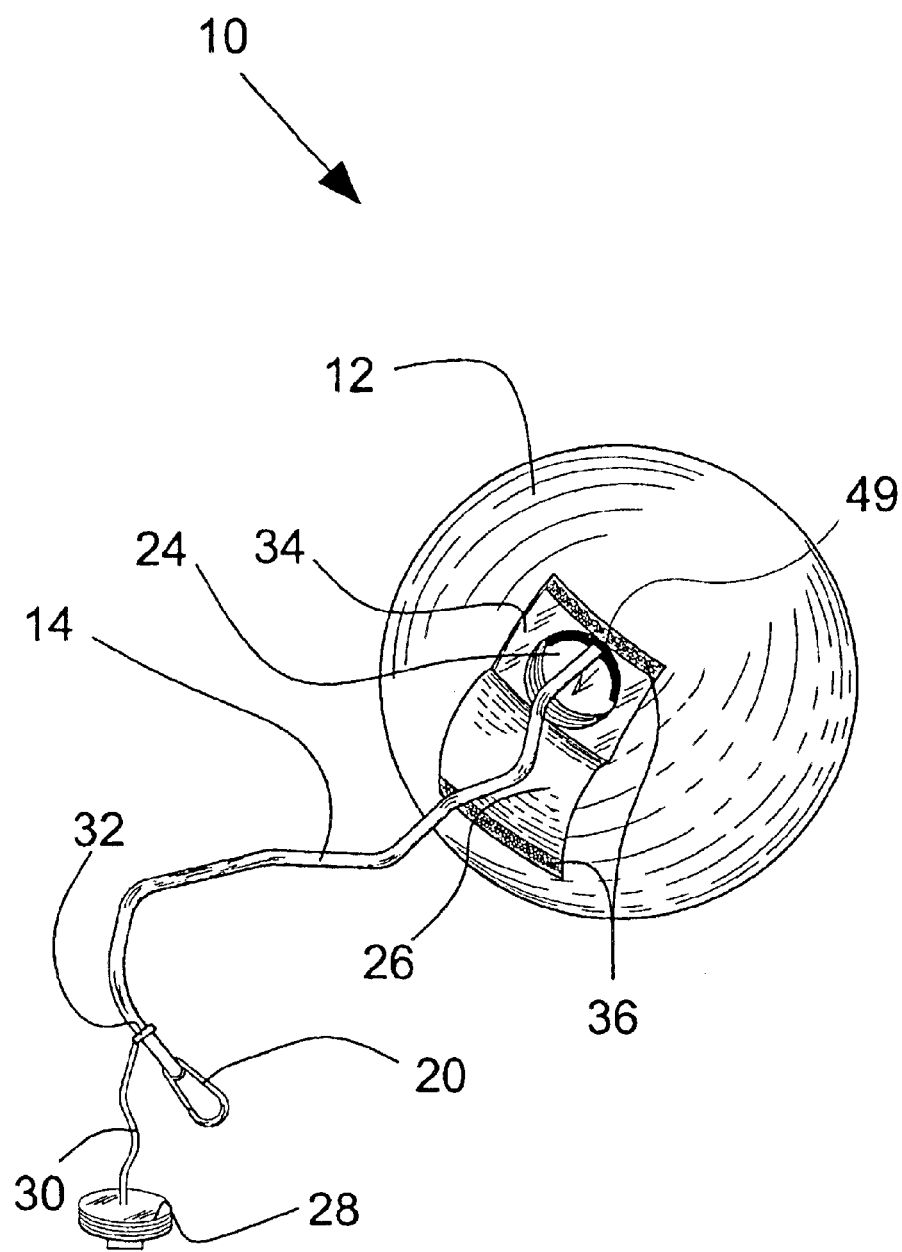
FIG. 3 is a perspective view of the present invention.

Turning to FIG. 3 shown therein is a perspective view of the present invention 10. Shown is a perspective view of the present invention 10 having the leash element 14 deployed from the storage cavity 24 whereby the ball-leash can be used as a leash. The leash function of the ball-leash has 14 fastened on one end to an internal tensioning member (not shown, but see FIG. 4) such as a spring and on a second end to a clip fastener 20 for attachment to the pet. The leash element is retrievable by opening flap 26 and removing the threaded cap 28 from the aperture. The caps 28 has tether 30 fastened to the leash element to enable the element to be withdrawn from the cavity 24 of the ball structure 12. Shown are the leash strap 14, clasp 20, collar 32, recess 34 and hook and loop fastener 36.

Figure 4:
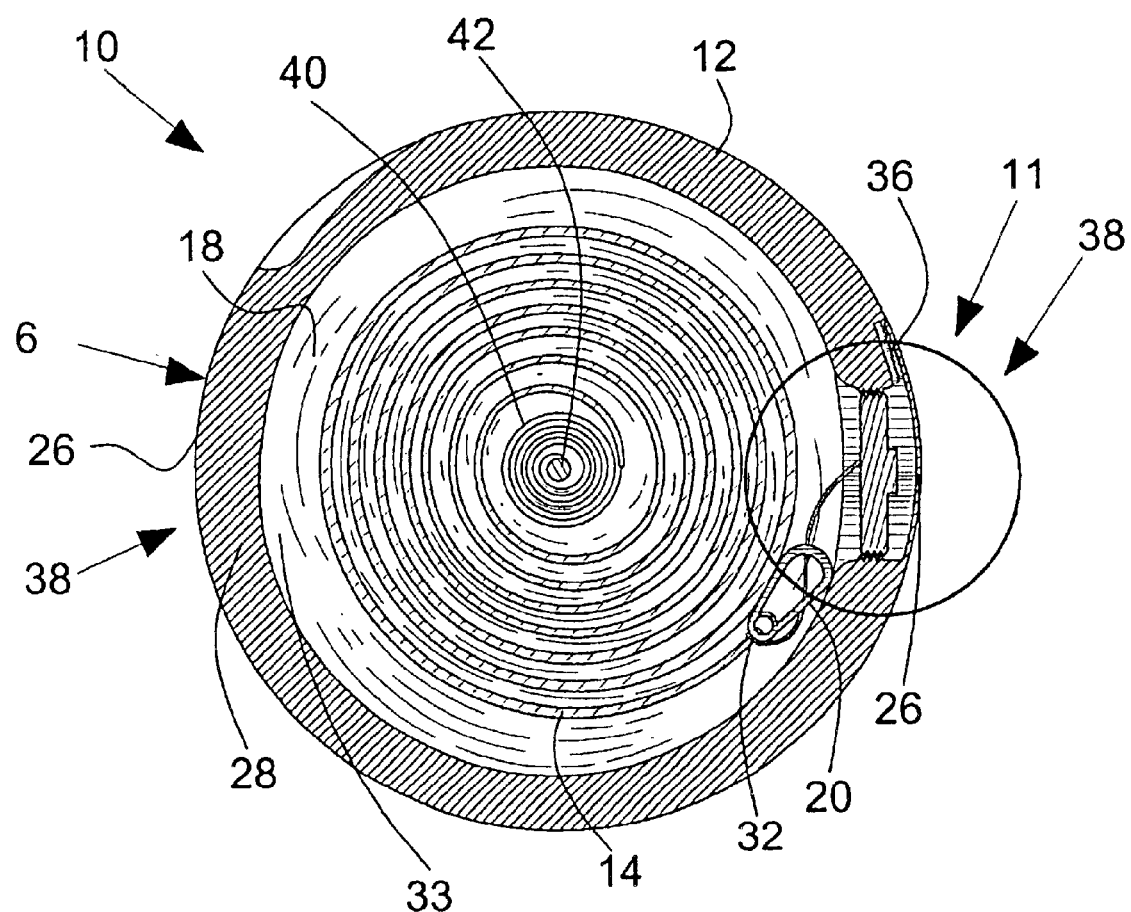
FIG. 4 is a sectional view of the present invention.

Turning to FIG. 4, shown therein is a sectional view of the present invention 10. Shown is a sectional view of the ball-leash of the present invention 10 comprised of a hollow sphere 12 forming the housing for the leash elements. The ball housing 12 has a flap 26 formed in the exterior covering of the ball 12 which covers the structural material of the ball which may be made of an elastomeric material or plastic. Formed within the structural wall is threaded apertures 38 having mating threaded cap 28 which when seated forms a watertight container for the leash elements contained internally. The leash elements are retrievable from the interior by threadedly removing the cap 28, which has a tether connecting the cap to the leash element. The leash strap 14 for the pet is fixedly attached to a tensioning member 40 such as a helical spring disposed on center post 42 whereby the strap 14 will retract into the housing 12 when outward pressure is removed therefrom. Shown is eyelet collar 32 for connecting to the leash 14, clasp 20 and hook and loop fastener 36.

Figure 5:
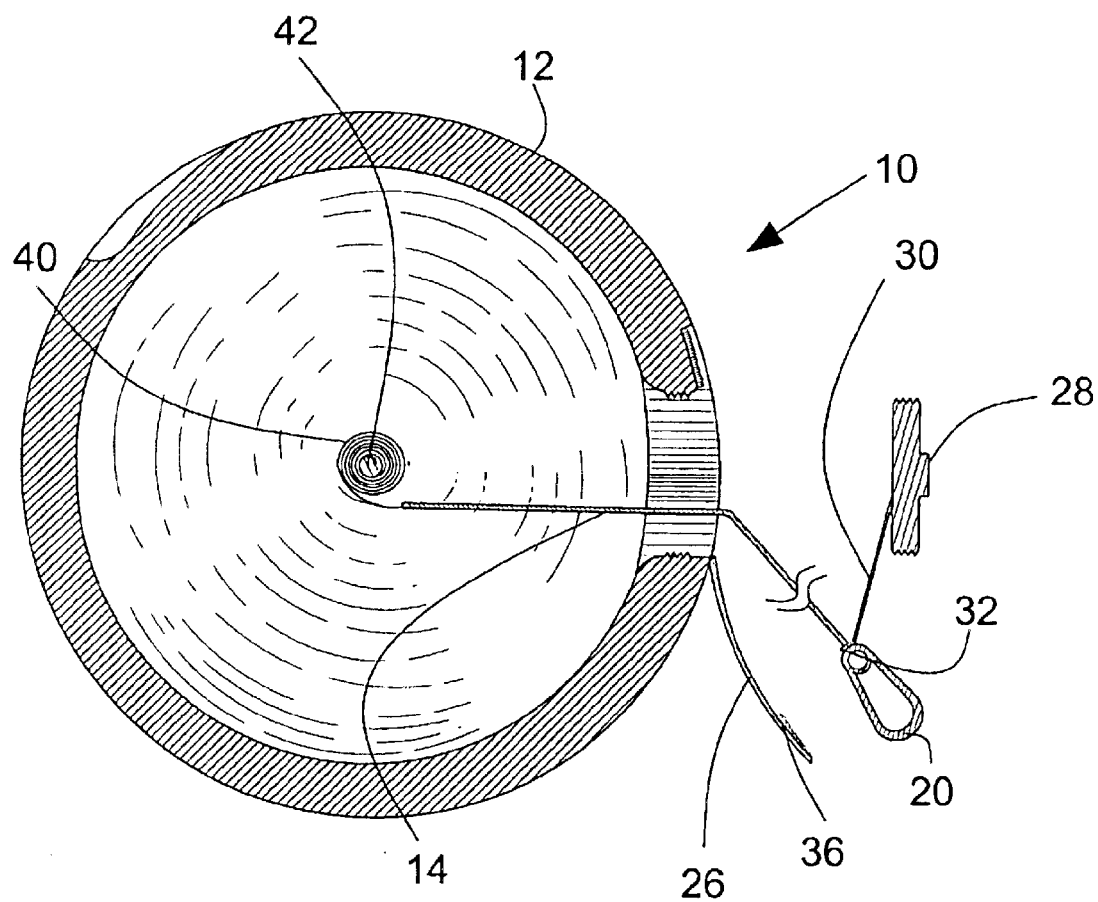
FIG. 5 is a sectional view of the extended leash elements.

Turning to FIG. 5, shown therein is a sectional view of the extended leash element. Shown is the present invention 10 having the leash element 14 in the extended position. The cap 28 is removed from the housing 12 enabling the leash element 14 to be withdrawn from the interior of the housing 12 by means of tether 30 extending from the cap 28 to the leash element. The strap 14 for the pet has a fastener 20 positioned on the distal end connected to a tensioning member 40 on center post 42 which will retract the strap 14 into the housing 12 as the cap 28 is threaded back into the housing structure. Shown are flap 26, hook and loop fastener 36, and collar 32.

Figure 6:
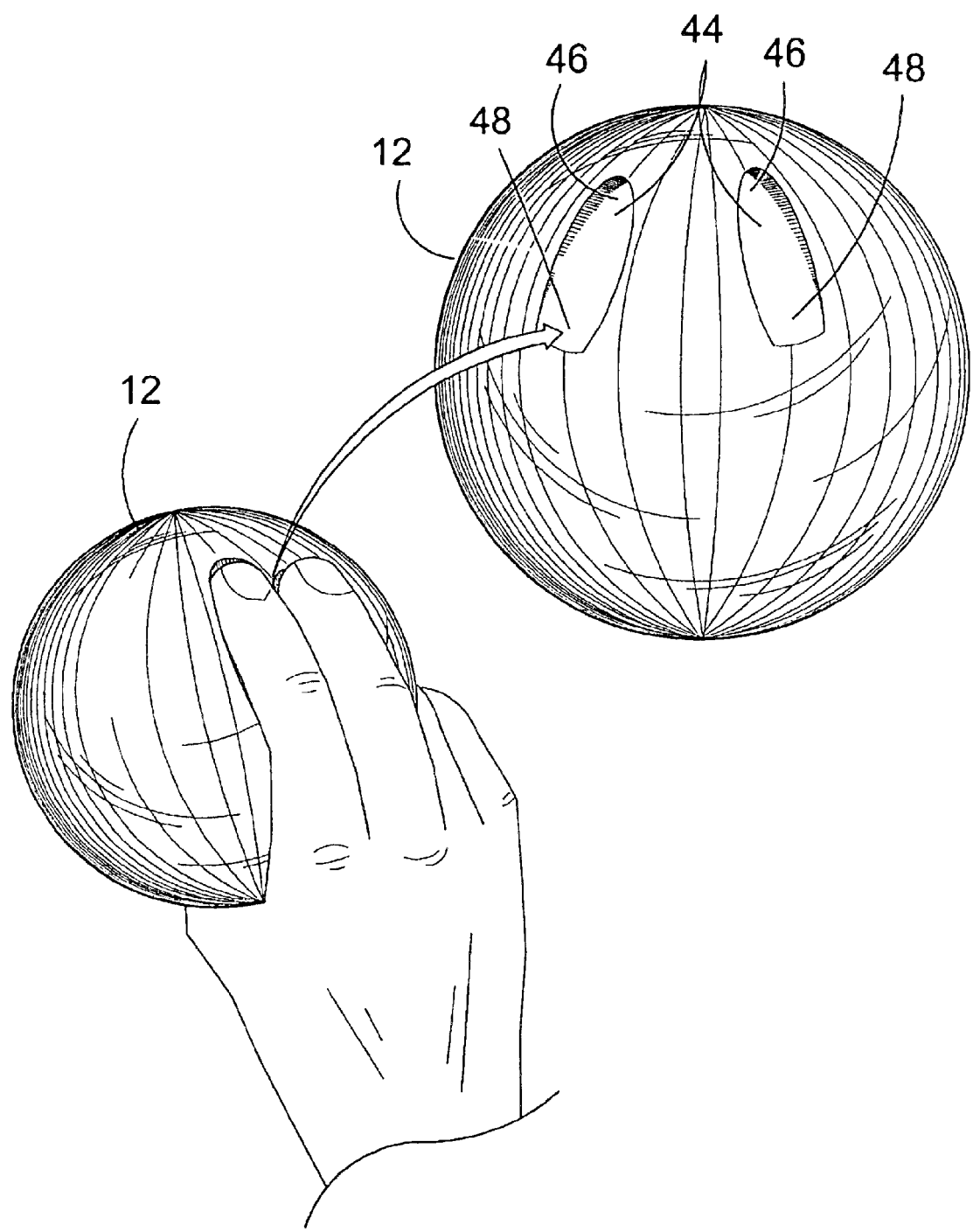
FIG. 6 is an illustrated view of the channels gripping members.

Turning to FIG. 6 shown therein is a view of the present invention having means for gripping the exterior surface of 12. The gripping means 44 is comprised of a pair of dimples 46 having channels 48 extending from the surface of the ball to the trough of the dimples 46 whereby a user can place the tips of their fingers into the gripping means 44 providing secure means for holding onto the present invention 10 as it is being used as a leash. Furthermore the positioning of the gripping means allows the user to extend their thumb to the leash locking element 49 to prevent further release of leash 14.

Figure 7:
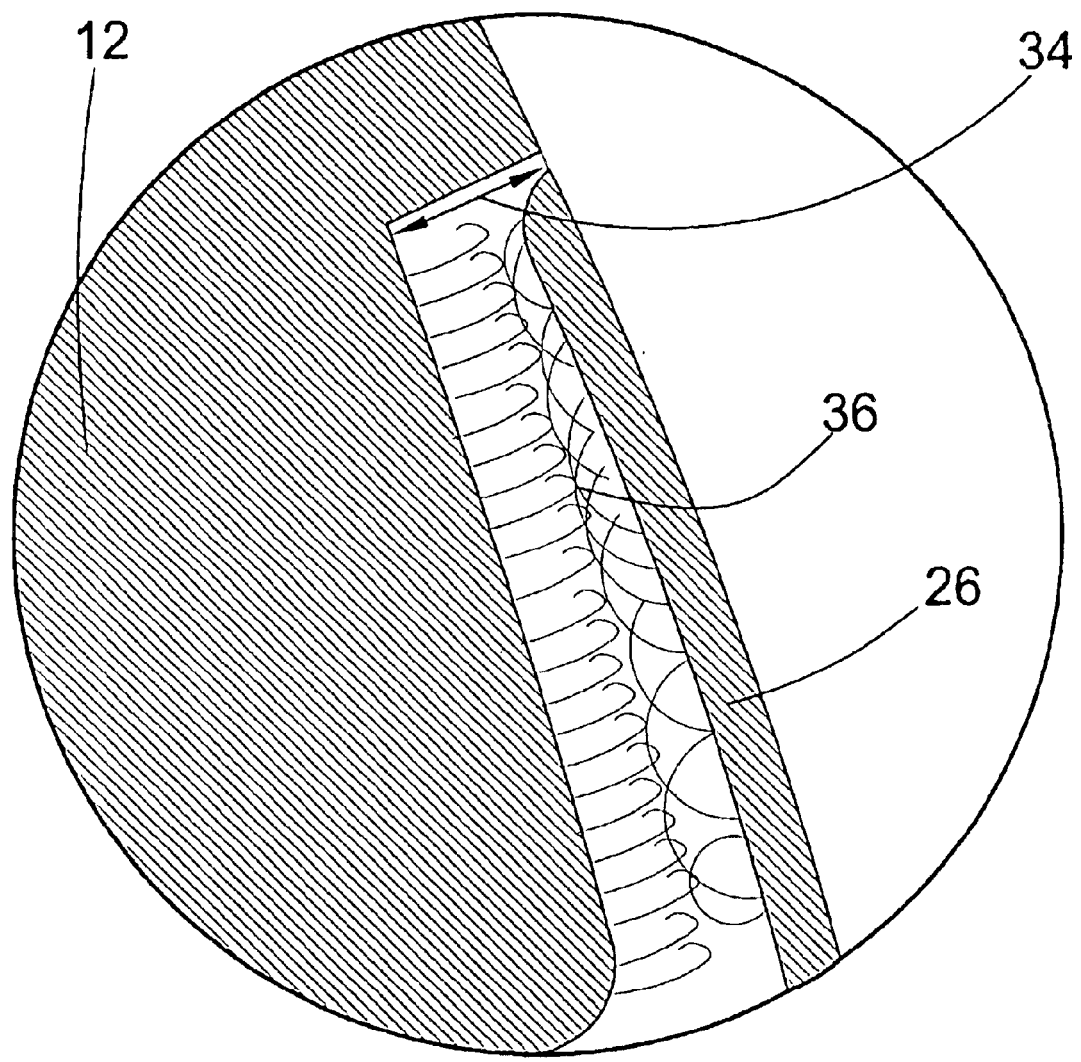
FIG. 7 is a sectional view of the flap fastener element.

Turning to FIG. 7, shown therein is a sectional view of the flap 26 fastener element. Shown is an enlarged view of the mating hook and loop material 36 that forms means for securing the flap 26 in recess 34 to the structure of the ball housing 12 of the ball-leash. The housing 12 has flap 26 formed in the exterior covering of the ball which covers the structural material of the ball. The flap 26 covers the threaded cap providing access to the leash element contained within the interior of the housing 12. The flap 26 protects the pet from coming into contact with the leash access cap. The flap 26 once secured to the housing 12 forms a somewhat seamless covering whereby the ball-leash functions as a ball being able to roll and bounce as the normal functions of a ball. It also helps protect the leash access cap 28 (not shown, but see FIG. 8) from being deformed or fouled from dirt and debris.

Figure 8:
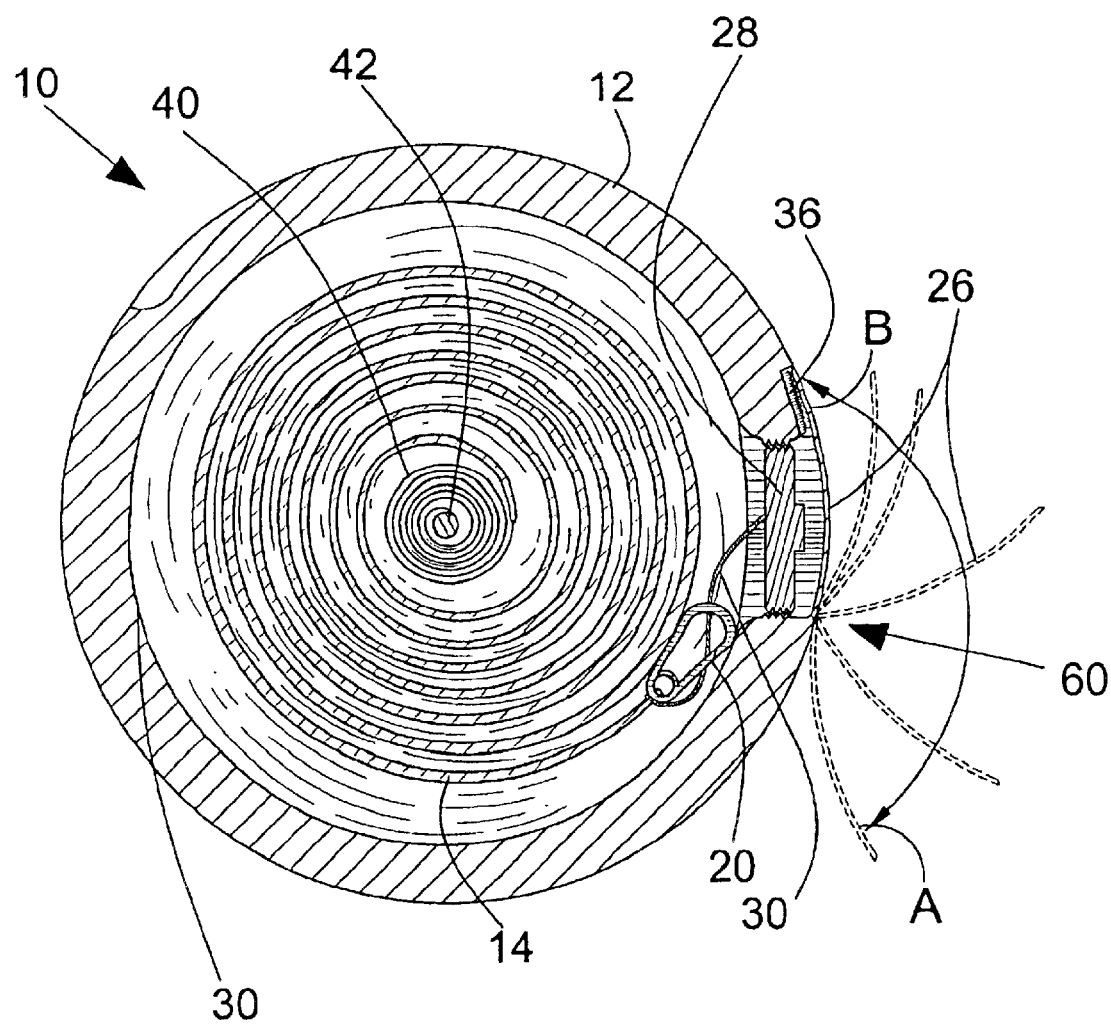
FIG. 8 is a sectional view of the present invention.

Turning to FIG. 8, shown therein is a sectional view of the present invention 10. Shown is a sectional view of the ball-leash of the present invention 10 showing the movement of the flap 26 on live hinge 60 from position "A" to "B" providing access to the leash access cap 28. Shown is the housing 12 comprised of a hollow sphere having a cap 26 formed in the exterior sheathing that covers the structural material of the ball-leash that can be constructed from a polymer or an elastomeric material having a threaded aperture with mating threaded cap 28 that when seated forms a watertight container for the leash element 14. The leash elements 14 is retrievable from the interior by folding the flap 26 back and threadedly removing cap 28 which has a tether 30 connecting the cap 28 to the respective leash element. As shown, the strap 14 for the pet is fixedly attached to a tensioning member 40 on post 42 whereby the strap 14 will retract into the housing 12 as the cap 28 is returned to its seated position. Also shown is clasp 20 and hook and loop material 36.

Figure 9:
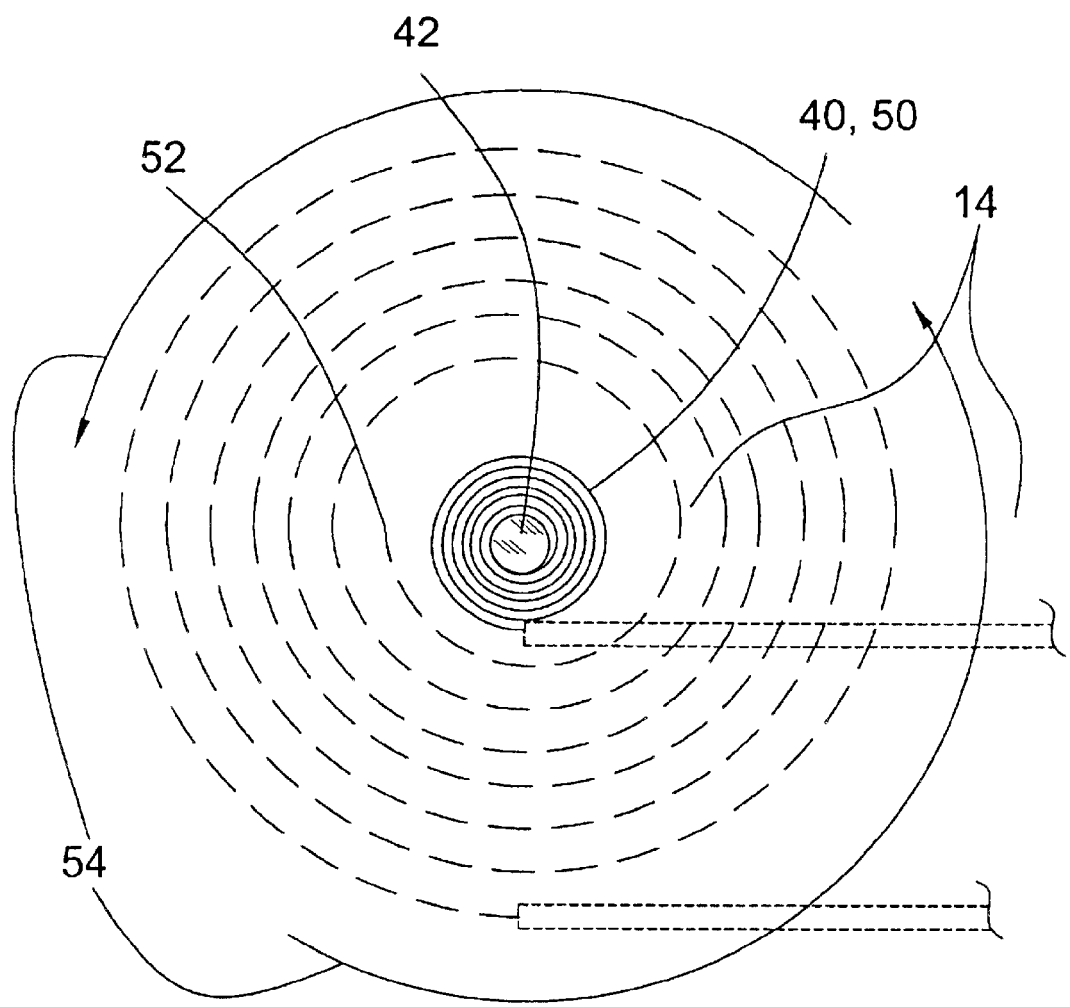
FIG. 9 is an illustrative view of the pet leash and retraction element.

Turning to FIG. 9, shown therein is an illustrative view of the pet leash and retraction element. The pet leash strap 14 is fixedly attached to a tensioning member 40 on post 42, such as a wound spring 50, whereby the pet leash strap 14 can be retracted into the housing as outward pressure is released. The cavity of the housing determines the space available for the pet strap 14 which can take the shape of a cord or strap with the cord providing the greater potential length of the pet strap. A wound spring 50 provides the most cost effective method and the least complicated means for providing an extendible retractable pet leash strap. Also shown are the unwound spring 52 and the direction of winding arrow 54.

Figure 10:
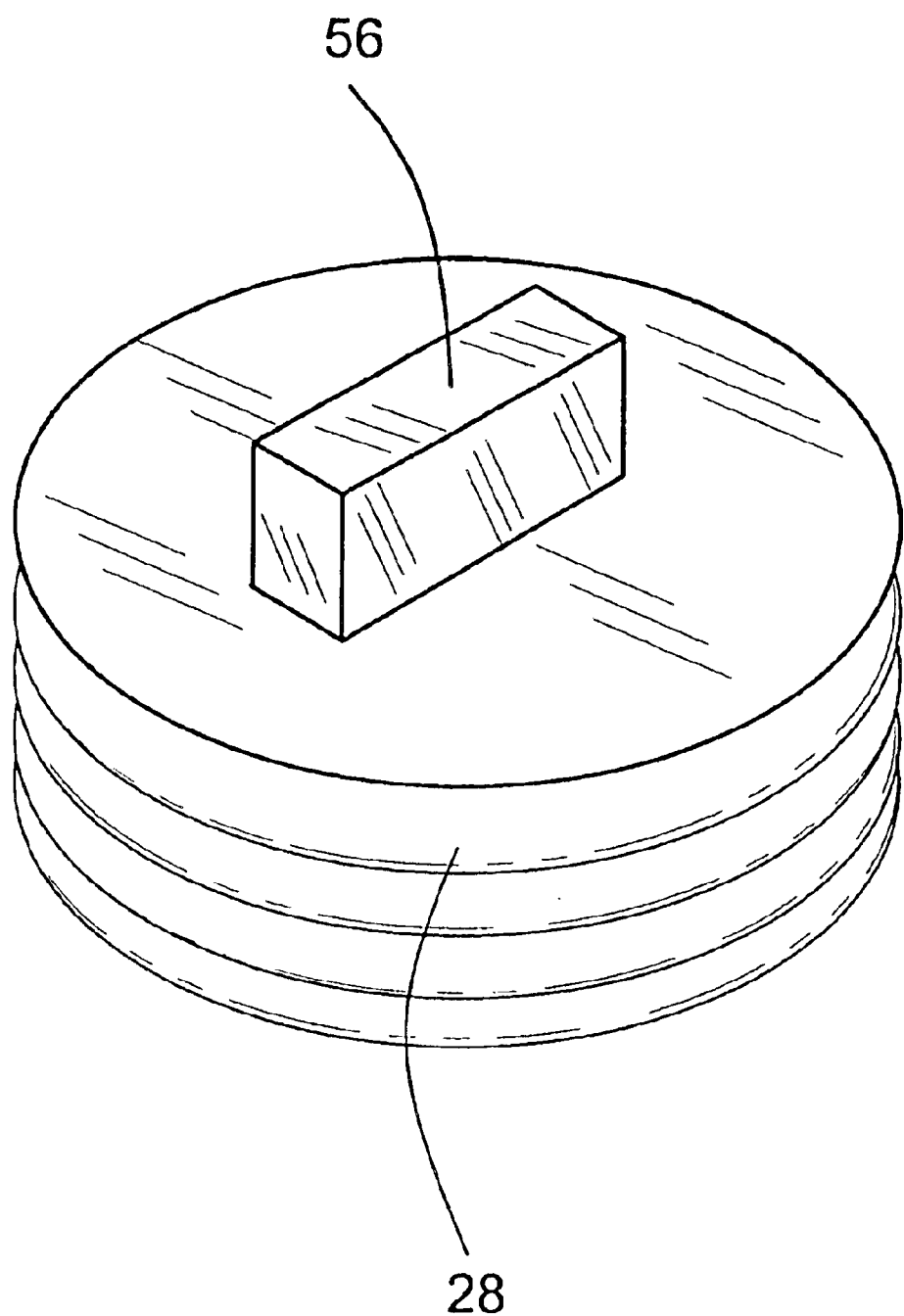
FIG. 10 is a perspective view of the threaded leash access cap.

Turning to FIG. 10, shown therein is a perspective view of the threaded leash access cap 28. The threaded leash access cap 28 enables the leash element to be retracted into the housing cavity. Once the cap 28 is seated, the integrity of the ball-leash housing is similar to any hollow sphere or ball. The cap 28 also forms the means whereby the leash element can be retracted into the cavity of the housing having a tether connecting the cap to the leash element. The construction also prevents loss of the cap 28 when it is removed from the housing since it will be attached to the leash element. While the cap 28 is depicted as having a tab 56 extending therefrom for being grasped by a user, it would also be possible to have an indentation with a frictionous surface for threading and unthreading the caps.

Figure 11:
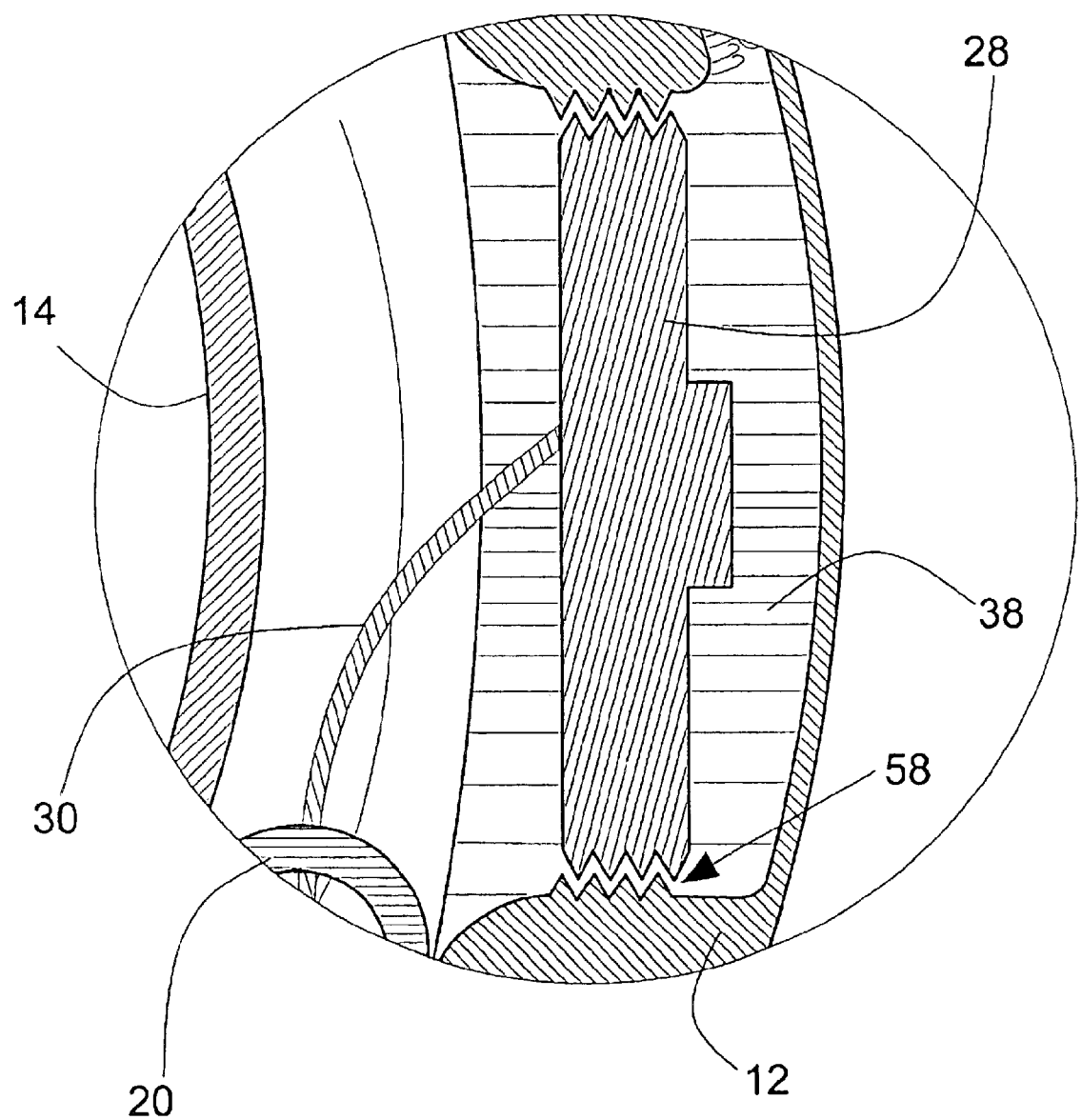
FIG. 11 is an enlarged sectional view of a seated leash access cap.

Turning to FIG. 11, shown therein is an enlarged sectional view of a seated leash access cap 28. Shown is an enlarged view of a seated leash access cap 28 taken from FIG. 4 as indicated. The structural wall of the ball housing 12 has threaded aperture 38 therein which provides means for extending and retracting the leash element therethrough. While the leash element is contained within the housing 12 and the cap 28 seated in threaded aperture 38 the ball-leash can function as a ball having the normal properties of rolling and bouncing. Once the cap 28 is removed the leash element is withdrawn by means of the attached tether 30 from the interior of the housing and the ball-leash can function as a leash with a tensioned pet strap 14 having a clasp 20 thereon which will automatically take up the slack as the distance from the pet varies. Mating threads 58 are also shown on cap 28.

I claim:

1. An apparatus for a ball and an animal leash for connecting to the collar of an animal in combination, comprising:
   a) a spherical housing having a cavity therein, wherein said spherical housing forms a ball, said housing having an aperture therein, wherein said aperture is threaded;

b) a threaded cap disposed in said threaded aperture, wherein said threaded cap mates with said threaded aperture, said threaded cap having an inside surface and an outside surface;

c) a flap covering each said threaded aperture having means for attaching said flap to said spherical housing whereby the said flap may be opened and closed to allow access to the said threaded cap;

d) a leash disposed internal said spherical housing, said leash having first and second opposing ends, wherein said first end comprises a tether connecting said first end of said leash to said inside surface of said first threaded cap to permit said leash to be withdrawn from said cavity of said spherical housing when said threaded cap is removed from said threaded aperture, and wherein said first end of said leash comprises a fastener for connection to the collar of an animal;

e) means for extendably retracting said leash from the cavity of the spherical housing whereby the leash can be automatically retracted after it is extended by removing the outward tension on the leash, wherein said second end of said leash is connected to said means for extendably retracting said leash; and, f) means for gripping the exterior of the spherical housing comprised of a pair of spaced apart dimples having channels extending from the base of the dimples to the surface of the spherical housing.

2. The apparatus of claim 1, further comprising an exterior cover disposed about said spherical housing to protect the apparatus.

3. The apparatus of claim 2, wherein said exterior cover comprises an elastomeric material to protect the apparatus.

4. The apparatus of claim 3, wherein said exterior cover comprises a polymer material to protect the apparatus.

5. The apparatus of claim 4, wherein said exterior cover comprises a plastic material to protect the apparatus.

6. The apparatus of claim 5, wherein said means for attaching said flap to said spherical housing, comprises:

a) wherein each of said flap has a first and a second opposing end, a pair of sides, and an inner and outer surface, wherein said first end of each said flap is disposed on a first side of said threaded aperture and said second end of each said flap is disposed on a second opposite side of said threaded aperture;

b) a live hinge connecting each said first end of said flap to said first side of each said threaded aperture;

c) wherein said second side of said threaded aperture has a recess therein, said recess having an outer surface thereon, wherein a first piece of hook and loop material is disposed on said outer surface of said recess; and, d) wherein a second piece of mating hook and loop material is disposed on said inner surface of each said second end of said flaps for mating attachment to said first piece of hook and loop material to permit said first and second flaps to be opened and closed.

7. The apparatus of claim 6, wherein said fastener disposed on said first end of said leash further comprises a clasp to permit attachment to the collar of an animal.

8. The apparatus of claim 7, wherein said means for extendably retracting said leash comprises:

a) a center post being centrally disposed in said spherical housing; and, b) a helical spring disposed on said center post, said spring having a first and second opposing end, wherein said first end of said spring is connected to said second end of said leash, wherein said second of said spring is connected to said center post so that said leash can be withdrawn from said cavity by using outward tension and said leash will return to said cavity when the outward tension on said leash is removed.

9. The apparatus of claim 8, further comprising a tab disposed on said outside surface of said threaded cap to permit a user to grasp and turn the threaded cap.

10. The apparatus of claim 9, further comprising an indentation having a frictionous surface disposed on said outside surface of said threaded cap to permit a user to grasp and turn the threaded cap.

* * * * *